United States Patent [19]
Diaz et al.

[11] 3,887,640
[45] June 3, 1975

[54] EXTRUSION COATING COMPOSITION CONTAINING ETHYLENEPROPYLENE BLOCK COPOLYMER AND POLYETHYLENE HAVING A MIR OF AT LEAST 50

[75] Inventors: Juan C. Diaz; Ray Edwards, both of Longview, Tex.

[73] Assignee: Eastman Kodak Company, Rochester, N.Y.

[22] Filed: Aug. 15, 1972

[21] Appl. No.: 280,934

[52] U.S. Cl. ............... 260/876 B; 117/155 UA; 117/161 UH; 260/878 B
[51] Int. Cl.² ............... C08F 15/00; C08F 19/00
[58] Field of Search ................................ 260/876 B

[56] References Cited
UNITED STATES PATENTS

| | | | |
|---|---|---|---|
| 3,328,486 | 6/1967 | Crawford | 260/876 B |
| 3,358,053 | 12/1967 | Hestettler | 260/876 B |
| 3,487,128 | 12/1969 | Okazaki | 260/876 B |
| 3,517,086 | 6/1970 | Shirayama | 260/876 B |
| 3,529,037 | 9/1970 | Hagemeyer | 260/878 |
| 3,647,922 | 3/1972 | Leugering | 260/876 B |
| 3,660,530 | 5/1972 | Hobilt | 260/876 B |
| 3,700,753 | 10/1972 | Terada | 260/876 B |

FOREIGN PATENTS OR APPLICATIONS

| | | | |
|---|---|---|---|
| 45-36419 | 11/1970 | Japan | 260/876 B |
| 1,154,447 | 6/1969 | United Kingdom | 260/876 B |

*Primary Examiner*—Paul Lieberman

[57] ABSTRACT

Extrusion coating compositions providing coatings having an improved balance of properties including heat resistance, greaseproofness, hardness, scuff resistance, good impact strength, pinhole resistance, and improved heat sealing characteristics are disclosed. These coatings contain propylene containing crystalline block copolymer and polyethylene having a MIR greater than 50.

10 Claims, No Drawings

EXTRUSION COATING COMPOSITION CONTAINING ETHYLENEPROPYLENE BLOCK COPOLYMER AND POLYETHYLENE HAVING A MIR OF AT LEAST 50

This invention relates to a novel polyolefin blend providing extrusion coatings having an unexpected and improved combination of properties. One aspect of this invention relates to a blend capable of providing extrusion coatings having an improved balance of physical properties. Another specific aspect of this invention is an extrusion coating composition containing at least two different polyolefins which form extrusion coatings having improved heat sealing properties, hardness, heat resistance and resistance to pinholes.

Extruding a coating of a polyolefin onto a substrate, such as paper, to form an extrusion coated substrate is well known in the art. Various polyethylenes and blends of polyethylenes have been widely used as extrusion coating compositions. These compositions form coatings having poor abrasion and heat resistance, as well as poor barrier properties. Polypropylene, regardless of its molecular weight (flow rate), is not a satisfactory extrusion coating material since it does not have high speed coating ability or a wide range of coating weights. Therefore, many of its advantageous properties cannot be utilized in extrusion coating applications. In order to improve polyolefin coating properties, blends of polyethylenes and polypropylene were used as extrusion coating compositions. Note, for example, U.S. Pat. No. 3,418,396 which describes and claims blends of polypropylene and polyethylene having excellent extrusion coating properties. Although the blends disclosed in U.S. Pat. No. 3,418,396 are useful in many applications, they have the disadvantage that such blends cannot be applied in coatings of 0.6 mil or less unless the polypropylene component of the blend has a flow rate of about 45 or greater. Since the flow rate is an indirect measure of molecular weight, i.e., molecular weight decreases as flow rate increases, and since certain properties of the polypropylene such as impact strength, heat sealing characteristics, and pinhole resistance are detrimentally affected by a decrease in molecular weight, it can be seen that the usefulness of these blends is limited by the necessity of using a low molecular weight (high flow rate) polypropylene. Therefore, it would be desirable to have an extrusion coating composition that could be applied in thin films of 0.6 mil or less which have the desirable properties of polypropylene such as heat resistance, greaseproofness, hardness, and scuff resistance and at the same time have good impact strength, pinhole resistance, and improved heat sealing characteristics, as well as high speed coating ability over a wide range of coating weights.

It is, therefore, an object of the present invention to provide an extrusion coating composition.

Another object of the invention is to provide an extrusion coating composition which provides a thin coating of 0.6 mil or less having an improved balance of physical properties.

Another object of this invention is to provide an extrusion coating composition which provides thin coatings having, in addition to other physical properties, good heat resistance, hardness, greaseproofness, scuff resistance, impact strength, pinhole resistance and improved heat sealing characteristics.

A further object of the invention is to provide an extrusion coating composition which has high speed coating ability over a wide range of coating weights from coatings of 0.6 mil or less to relatively thick coatings.

A still further object of this invention is to provide an extrusion coating composition which has high speed coating ability to provide coatings of 0.6 mil or less having excellent physical properties.

Further objects of the invention will be apparent from the following description of the invention.

In accordance with this invention, extrusion coating compositions having an improved balance of properties are obtained from a blend of a particular polyethylene and a crystalline ehtylene/propylene copolymer. These extrusion coating compositions provide a composition that has high speed coating ability and can also be extruded as very thin coatings of 0.6 mil or less onto a substrate. These thin coatings have, in addition to other desirable properties, good adhesion to the substrate, resistance to pinholes, good heat resistance, greaseproofness, good hardness and scuff resistance, and improved heat sealing characteristics. Heretofore, there has not been an extrusion coating composition having this combination of properties.

According to the present invention we have found that the disadvantages of the blends in U.S. Pat. No. 3,418,396 can be overcome by replacing the polypropylene component with a crystalline propylene/ethylene block copolymer. When propylene/ethylene block copolymer is substituted for the polypropylene, a lower flow rate propylene/ethylene block copolymer can be used. Such blends provide an extrusion coating composition having a high speed coating ability over a wide range of coating weights while retaining the advantageous properties of polypropylene, as well as improved impact strength, pinhole resistance, and heat sealability. It was surprising that such unexpected results were obtained with these blends and that maximum coating capabilities could be obtained with such blends containing ethylene/propylene block copolymers having lower flow rate (25 flow rate or greater) than the polypropylene (45 flow rate or greater) since both of these materials have essentially identical coating capabilities by themselves. Therefore, the compositions with which this invention is concerned are as follows:

| Component | Weight Percent Contained in Composition | | |
|---|---|---|---|
| | Broad Range | Preferred Range | Most Preferred |
| Propylene/Ethylene Block Copolymer | 40–99 | 75–97.5 | 90 |
| High MIR Polyethylene | 1–60 | 2.5–25 | 10 |

Another advantage of the blends of this invention is the ability to vary throughput to a minimum of 3 pounds/hour/inch of die width as opposed to the throughput of polypropylene which is a minimum of 5 pounds/hour/inch. More particularly, polypropylene, when used to coat a substrate, such as paper, with a die having a a throughput of 3 pounds/hour/inch in die width, would cause surging and severe edgeweave which is highly undesirable. The blends of this invention can be used to coat substrates using a throughput of 3 pounds/hour/inch of die width over extended periods of time without surging and have good neck-in stability.

In the extrusion coating of substrates such as paper and paperboard, it is necessary from both an economic and utility standpoint that the extrusion coating composition have high speed coating ability over a wide range of coating weights, from very thin (less than 0.5 mil) to relatively thick (greater than 1.0 mil). It is also desirable to use as high a molecular weight polymer as possible in order to obtain the maximum advantage in such properties as impact strength, resistance to pinholing, and heat sealability.

The propylene/ethylene block copolymers are crystalline copolymers prepared with stereospecific catalyst by alternate polymerization of propylene and ethylene or by alternate polymerization of propylene and a mixture of propylene and ethylene. These copolymers contain at least 80 weight percent polymerized propylene and preferably 90 weight percent. Processes for their preparation and the properties of these copolymers are contained in U.S. Pat. No. 3,529,037 issued Sept. 15, 1970.

The properties of a typical propylene-ethylene block copolymer or polyallomer useful in the present invention are as follows:

| Physical Properties | ASTM Procedure Number | |
|---|---|---|
| Flow Rate at 230°C., g/10 min. | D-1238-62T | 29 |
| Inherent Viscosity in Tetralin at 145°C. | | 1.08 |
| Density (Annealed), g/cc | D-1505-57T | 0.905 |
| Brittleness Temperature, °C. | D-746-57T | −2 |
| Tensile Strength at 2"/min. | D-638-64T | |
| At Break, psi. | | 2240 |
| At Yield, psi. | | 3570 |
| Elongation at Break, % | D-638-64T | 550 |
| Stiffness in Flexure, $10^5$ psi. | D-747-63T | 0.99 |
| Vicat Softening Point, °C. | D-1525-58T | 122.2 |
| Hardness, Rockwell R Scale | D-785-60T | 74 |
| Impact Strength | D-256-66 | |
| Notched Izod at 23°C., ft-lb/in. of notch | Method A | 1.01 |
| Unnotched Izod at 23°C., ft-lb/in. of width | | No Break |
| Ash Content, %* | | 0.009 |

* Ash content is determined by placing a 10 ± 1.0 gram sample of polymer in a clean crucible that has been heated at 800 ± 25°C. for 15-20 minutes, cooled and tared, heating the sample and crucible at 800 ± 25°C. for 15 ± 0 minutes in a furnace with an excess of air. Percent ash is calculated as follows:

$$\text{Percent ash} = \frac{\text{Wgt. of crucible} + \text{ash} - \text{wgt. crucible}}{\text{Wgt. of crucible} + \text{sample} - \text{wgt. crucible}} \times 100$$

The flow rate of the copolymer useful in this invention is between 15 dg/minute and 100 dg/minute, with the preferred minimum being about 20 dg/minute and still more preferably at or having about 25 dg/minute.

The polyethylene component must have a high melt index recovery (at least 50 percent), a density of above about 0.912, and a relatively high melt index. It is prepared by methods known to the art, and representative materials are shown in the following table.

| Sample | Melt Index, dg/min. (190°C.) | Density, g/cc | Melt Index Recovery, Percent |
|---|---|---|---|
| 1 | 3.5 | 0.917 | 70 |
| 2 | 7.2 | 0.917 | 61 |
| 3 | 1.7 | 0.918 | 70 |
| 4 | 7.1 | 0.918 | 53 |
| Range | 1.0–15 | >0.912 | >50 |

The melt index recovery is particularly critical and must be above about 50 percent and preferably above about 60 percent.

It should be noted that a particular ethylene/propylene block copolymer can be blended with a particular polyethylene having the parameter of properties hereinbefore noted. Blends of such polymers can also be used, for example, a particular block copolymer or a blend of such block copolymers can be blended with a particular polyethylene or a blend of such polyethylenes.

The compositions of the invention may be prepared in various ways such as dry blending, dry blending and then passing through a compounding exturder, extruder, on a milling roll or in a Banbury mixer, by fusion, or by blending in solution. Any method whereby the components can be blended together will produce the desired blend. For example, pellets of each polymer are blended mechanically and the blend is fed to an extruder wherein it is fused and extruded.

Additives, stabilizers, fillers and the like can be added to the compositions of the present invention. Such materials can be present in the components forming the polymer blend, or may be added when the polymers are blended to form the extrusion coating composition.

This invention can be further illustrated by the following examples of preferred embodiments thereof, although it will be understood that these examples are included merely for purposes of illustration and are not intended to limit the scope of the invention unless otherwise specifically indicate.

EXAMPLE 1

The following blends were made by tumbling the components in a drum tumbler for 30 minutes and then homogenizing at a melt temperature of 165°C. in a 3½ inch 24:1 length to diameter ratio MPM extruder equipped with a standard polyethylene screw, i.e., 4:1 compression ratio, ½ metering flights, ¼ feed flights, and ¼ compression flights. The propylene/ethylene polyallomer had a flow rate of 29, density of 0.905, and an inherent viscosity of 1.08. The polypropylene had a flow rate of 34, density of 0.905, and an inherent viscosity of 1.02. The polyethylene had a melt index of 3.5, a density of 0.917, and a melt index recovery of 70 percent.

|  | Weight Percent in Blend | | |
| --- | --- | --- | --- |
|  | Propylene-Ethylene Polyallomer | Polypropylene | High MIR Polyethylene |
| Control A | 100 | — | — |
| Blend A | 90 | — | 10 |
| Blend B | — | 90 | 10 |
| Control B | — | 100 | — |

These blends were evaluated in the following manner:

Each blend was fed to a 3½ inch Egan extruder having a barrel length to diameter ratio of 24:1. The four zones of the extruder are maintained from back to front at 400°F., 500°F., 560°F., and 600°F. A metering type screw having six feed flights, six compression flights, and twelve metering flights was used. Prior to entering the die, the melt passed through one 14 × 88 mesh screen. The die was an Egan die, center fed with one-inch long lands with an opening of 16 × 0.020 inches. The melt temperature was held constant at 560°F. (304°C.). The extrusion rate was held constant at 160 pounds per hour. The resulting film extrudate was passed through a 4½-inch air gap into the nip formed by a rubber covered pressure roll and a chill roll. At the same time 40-pound Kraft paper was fed into this nip with the pressure roll in contact with the substrate, the nip pressure applied was 110 pounds per linear inch. The chill roll was a 24-inch diameter matte finish steel roll, water cooled to maintain a temperature of 65°F. on the roll. The coated paper was taken off the chill roll at a point 180° from the nip formed by the pressure roll and chill roll. The chill roll was operated at increasing line speeds until the coating either tore from the die or voids and uneven coatings were obtained. The following results were recorded:

|  | Maximum Coating Speed | Minimum Coating Thickness |
| --- | --- | --- |
| Blend A | 1200 ft/min. | 0.35 mil |
| Blend B | 700 ft/min. | 0.75 mil |
| Control A | 385 ft/min. | 1.0 mil |
| Control B | 400 ft/min. | 1.0 mil |

As can be seen, the polyallomer blend coats at a much higher speed and lower coating weight than the polypropylene blend. To obtain the same speed and coating weight, a polypropylene of at least 45 flow rate would have to be used. The polyallomer coating had superior toughness and heat sealability.

EXAMPLE 2

A polyallomer having a flow rate of 11 and containing approximately 1½% ethylene was blended with 10% by weight polyethylene having a melt index recovery of 74% in the same manner as described in Example 1. Extrusion coating results show this blend to coat to 390 ft./min. (approx. 1.0 mil coating thickness) with severe edgeweaving visible. It is obvious from the above results that higher flow rate base material is required.

EXAMPLE 3

The following blends were made as described in Example 1 combining polyallomer having 1½% ethylene and 29 flow rate with various melt index recovery polyethylenes. Extrusion coating compositions are also the same as described in Example 1. The following results were recorded:

| MIR of Polyethylene | Neck-In Inches/Edge | Max. Coating Speed ft/min |
| --- | --- | --- |
| 31 | 2.90 | 410 |
| 51 | 2.75 | 700 |
| 60 | 2.60 | 750 |
| 72 | 2.10 | 1200 |

It is obvious from the above results that the melt index recovery of the polyethylenes significantly affects the extrusion coating capabilities of the blends and that a melt index recovery of >50% would be required to obtain commercially acceptable coating speeds.

The extrusion coating compositions of the present invention can be extrusion coated onto substrate such as paper and paperboard. The coated substrates can be used in applications such as food trays, bags or packages for greasy materials such as dog food, potato chips, release papers and the like. One particular application for the coatings is the use of an extrusion coated paperboard as a food tray for packaging meals such as lunches which prior to serving can be quickly heated by a radiation device such as a microwave range or oven. These compositions, therefore, provide very thin extrusion coatings having good abrasion and heat resistance, excellent adhesion to the substrate and good barrier properties.

The invention has been described in detail with particular reference to preferred embodiments thereof, but it will be understood that variations and modifications can be effected within the spirit and scope of the invention.

We claim:

1. An extrusion coating composition capable of providing extrusion coatings of less than 0.6 mil thickness characterized by good hardness, scuff resistance, impact strength, pinhole resistance and heat sealing properties consisting of a polymer blend consisting essentially of 40 to 99 percent, by weight, of an ethylene/propylene block copolymer containing at least 80 weight percent polymerized propylene having a flow rate of about 15 dg/minute to 100 dg/minute as determined by ASTM D-1238-62T and 1 to 60 percent, by weight, of polyethylene having a MIR of at least 50 and a density greater than 0.912.

2. An extrusion coating composition according to claim 1 wherein said ethylene/propylene block copolymer has a flow rate of about 20 dg/minute to 100 dg/minute.

3. An extrusion coating composition according to claim 2 wherein said ethylene/propylene block copolymer has a flow rate of about 25 dg/minute to 100 dg/minute.

4. An extrusion coating composition according to claim 1 consisting of a polymer blend consisting essentially of 75 to 97.5 percent, by weight, of an ethylene/propylene block copolymer containing at least 80 percent polymerized propylene having a flow rate of about 15 dg/minute to 100 dg/minute and 2.5 to 25 percent, by weight, of polyethylene having a MIR of at least 50 and a density greater than 0.912.

5. An extrusion coating composition according to claim 4 wherein said ethylene/propylene block copolymer has a flow rate of about 20 dg/minute to 100 dg/minute.

6. An extrusion coating composition according to claim 5 wherein said ethylene/propylene block copolymer has a flow rate of about 25 dg/minute to 100 dg/minute.

7. An extrusion coating composition according to claim 2 consisting of a polymer blend consisting essentially of about 90 percent, by weight, of an ethylene/propylene block copolymer containing at least 80 percent polymerized propylene having a flow rate of about 15 dg/minute to 100 dg/minute and about 10 percent, by weight, of polyethylene having a MIR of at least 50 and a density greater than 0.912.

8. An extrusion coating composition according to claim 7 wherein said ethylene/propylene block copolymer has a flow rate of about 20 dg/minute to 100 dg/minute.

9. An extrusion coating composition according to claim 8 wherein said ethylene/propylene block copolymer has a flow rate of about 25 dg/minute to 100 dg/minute.

10. An extrusion coating composition according to claim 4 wherein said polyethylene has a MIR of from 60 to 70.

* * * * *

PO-1050
(5/69)

UNITED STATES PATENT OFFICE
CERTIFICATE OF CORRECTION

Patent No. 3,887,640  Dated June 3, 1975

Inventor(s) Juan C. Diaz and Ray Edwards

It is certified that error appears in the above-identified patent and that said Letters Patent are hereby corrected as shown below:

Column 3, line 61, "having" should read ---above---.

Column 4, line 25, "exturder," should be deleted.

Column 4, line 26, after "truder," insert ---compounding---.

Column 4, line 67, "indicate" should read ---indicated---.

Column 8, line 8, after "50" insert ---percent---.

Column 8, line 20, after "70" insert ---percent---.

Signed and Sealed this twenty-eight Day of October 1975

[SEAL]

Attest:

RUTH C. MASON
Attesting Officer

C. MARSHALL DANN
Commissioner of Patents and Trademarks